United States Patent [19]

Aldridge et al.

[11] Patent Number: 5,336,654
[45] Date of Patent: * Aug. 9, 1994

[54] METHOD FOR THE PREPARATION OF SUPPORTED HYDROGENATION AND HYDROTREATING CATALYSTS

[75] Inventors: Clyde L. Aldridge; Kenneth L. Riley, both of Baton Rouge, La.

[73] Assignee: Exxon Research and Engineering Company, Florham Park, N.J.

[*] Notice: The portion of the term of this patent subsequent to Nov. 17, 2009 has been disclaimed.

[21] Appl. No.: 30,751

[22] Filed: Mar. 11, 1993

Related U.S. Application Data

[63] Continuation-in-part of Ser. No. 632,723, Dec. 24, 1990, Pat. No. 5,198,100.

[51] Int. Cl.$^5$ ............... B01J 37/20; B01J 37/08; B01J 27/049; B01J 27/043
[52] U.S. Cl. ............... 502/170; 502/219; 502/220; 502/151; 502/174; 502/210; 502/211
[58] Field of Search ............... 208/216 R, 217, 254 H, 208/89; 502/219, 220, 151, 170, 174, 210, 211, 219, 220

[56] References Cited

U.S. PATENT DOCUMENTS

| | | | |
|---|---|---|---|
| 3,961,036 | 6/1976 | Hammer et al. | 423/628 |
| 4,006,198 | 2/1977 | Tesel et al. | 260/682 |
| 4,498,979 | 2/1985 | Eberly | 208/216 R |
| 4,500,424 | 2/1985 | Simpson et al. | 208/216 PP |
| 4,574,120 | 3/1986 | Thompson | 502/220 |
| 4,648,963 | 3/1987 | Kutes et al. | 208/254 H X |
| 4,655,905 | 4/1987 | Plumail et al. | 208/254 H X |
| 4,689,314 | 8/1987 | Martinez et al. | 502/210 |
| 4,740,295 | 4/1988 | Bearden et al. | 208/254 H X |
| 4,810,684 | 3/1989 | Kemp | 502/211 |
| 4,818,743 | 4/1989 | Simpson et al. | 502/211 |
| 4,880,522 | 11/1989 | Kemp | 208/216 PP |
| 4,886,582 | 12/1989 | Simpson | 502/211 |
| 4,960,506 | 10/1990 | Halbert et al. | 208/254 H X |
| 4,969,990 | 11/1990 | Simpson | 208/216 PP |
| 4,990,243 | 2/1991 | Winslow et al. | 208/254 H |
| 5,164,354 | 11/1992 | Aldridge et al. | 502/220 |

*Primary Examiner*—Linda Skaling
*Assistant Examiner*—Douglas J. McGinty
*Attorney, Agent, or Firm*—Henry E. Naylor

[57] ABSTRACT

A method for the preparation of catalysts for heteroatom removal, particularly sulfur, from petroleum and synthetic fuel feedstocks. The catalyst is comprised of at least one Group VIII metal, and at least one Group VI metal, on a refractory support. The present method for preparing said catalysts comprises impregnating the Group VIII metal onto the refractory support by use of a Group VIII metal salt of an acid, and impregnating the Group VI metal onto the support by way of a Group VI heteropolyacid, wherein the acid comprising the salt of the Group VIII metal is less acidic than the heteropolyacid. The catalysts are then subjected to a heat treatment which includes a first phase wherein the catalyst is dried of free water and a second phase wherein the catalyst is heated to a temperature up to about 300° C. at a heating rate from about 0.15° C./min to about 15° C./min.

17 Claims, 4 Drawing Sheets

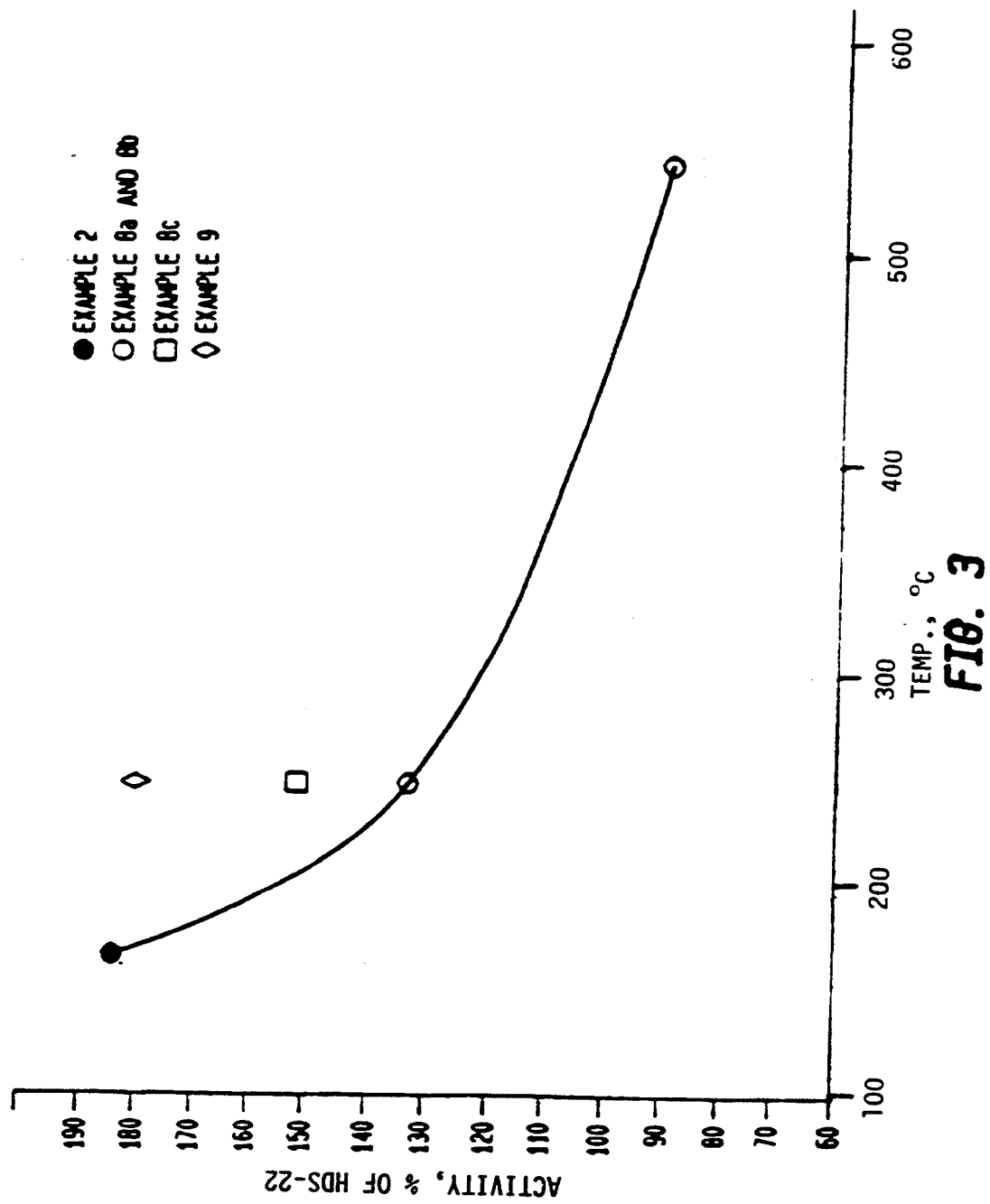

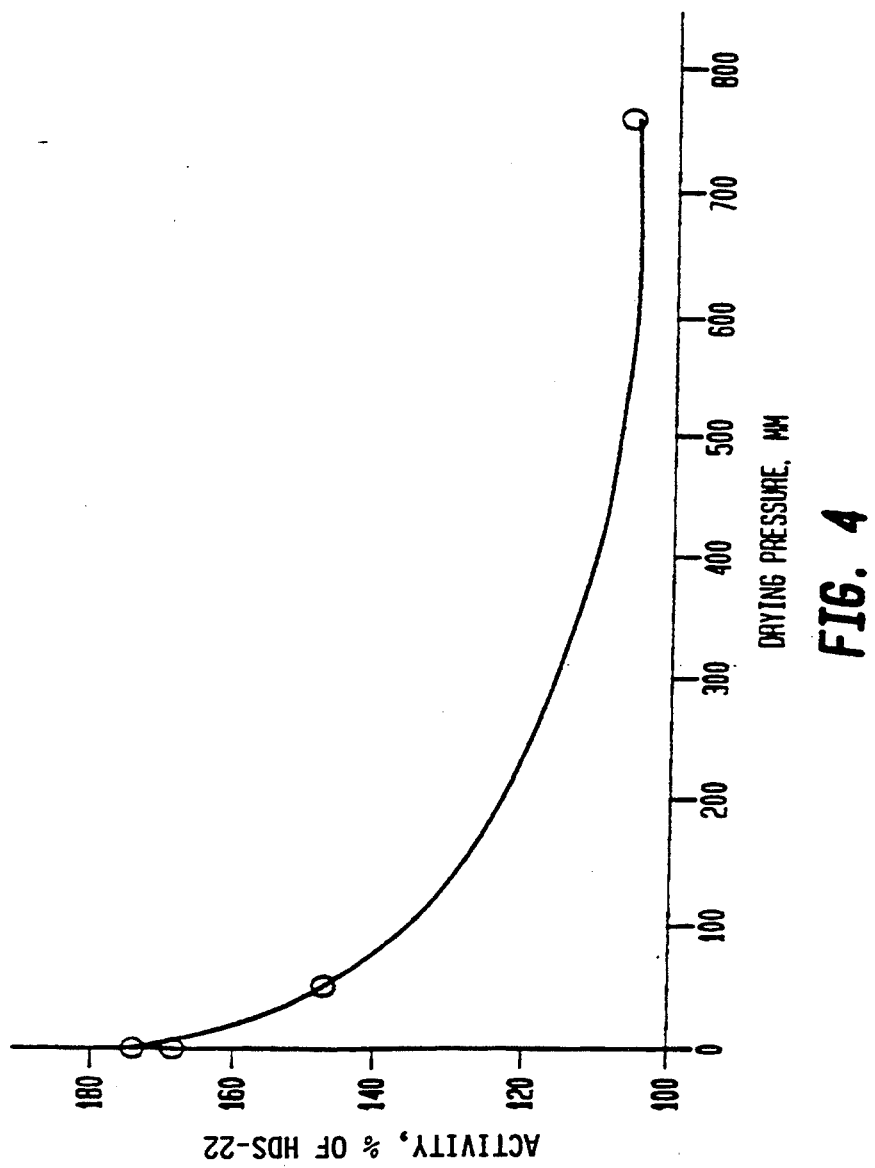

METHOD FOR THE PREPARATION OF SUPPORTED HYDROGENATION AND HYDROTREATING CATALYSTS

CROSS-REFERENCE TO RELATED APPLICATIONS

This application is a continuation-in-part of U.S. Ser. No. 632,723, filed Dec. 24, 1990, now U.S. Pat. No. 5,198,100.

FIELD OF THE INVENTION

The present invention relates to the preparation of catalysts for heteroatom removal, particularly sulfur, from petroleum and synthetic fuel feedstocks. The catalyst is comprised of at least one Group VIII metal, and at least one Group VI metal, on a refractory support.

BACKGROUND OF THE INVENTION

Hydrotreating of petroleum feedstocks and various boiling fractions thereof has become increasingly important because of more stringent product quality requirements. For example, governmental regulations concerning allowed limits of sulfur in petroleum products, such as diesel fuel, become more limiting each year. Furthermore, the petroleum industry foresees the time when it will have to turn to relatively high boiling feeds derived from such materials as coal, tar sands, oil-shale, and heavy crudes. Feeds derived from such materials generally contain significantly more deleterious components, such as sulfur, nitrogen, oxygen, halides, and metals. Consequently, such feeds require a considerable amount of upgrading in order to reduce the content of such components, thereby making them more suitable for further processing, such as fluid catalytic cracking, catalytic reforming, etc.

Hydrotreating of hydrocarbonaceous feeds is well known in the art and usually requires treating the feed with hydrogen in the presence of a supported catalyst at hydrotreating conditions. The catalyst is typically comprised of a Group VI metal with one or more Group VIII metals as promoters on a refractory support. Hydrotreating catalysts which are particularly suitable for hydrodesulfurization or hydrodenitrogenation generally contain molybdenum or tungsten on alumina promoted with a metal such as cobalt, nickel, iron, or a combination thereof. Cobalt promoted molybdenum on alumina catalysts are most widely used for hydrodesulfurization, while nickel promoted molybdenum on alumina catalysts are the most widely used for hydrodenitrogenation.

Further, "Novel Hydrotreating Catalysts Prepared From Heteropolyanion Complexes Impregnated On Alumina", by A.M. Maitra and N.W. Cant, *Applied Catalysis*, 48 (1989) pp. 187-197, teaches hydrotreating catalysts prepared by impregnating alumina with solutions of heteropolyanions having the general structure $[H_wA_xB_yO_z]^{n-}$, where A may be Co or Ni, and B may be Mo or W. This reference also shows that these catalysts were tested for hydrodesulfurization and hydrodenitrogenation activity and were found to have no significant advantage over standard commercial hydrotreating catalysts.

While catalysts containing molybdenum with nickel, cobalt, or both, are in extensive commercial use today, they have limitations with respect to removing heteroatoms from heavy feeds, such as heavy coker gas oils and coal derived gas oils. As the feeds become heavier, the content of condensed aromatic hydrocarbons, with and without heteroatoms, increases. These condensed aromatics can absorb strongly on the catalyst sites reducing both the rate and extent of heteroatom removal. Consequently, there exists a need in the art for improved hydrotreating catalysts having increased activity toward such heavy feeds, particularly when the heteroatom to be removed is sulfur or nitrogen.

SUMMARY OF THE INVENTION

In accordance with the present invention there is provided a method for preparing a catalyst composition, which method comprises:

(a) impregnating an inorganic oxide support material with a Group VIII metal salt of an acid and with a Group VI heteropolyacid, wherein the acidity of the acid of the salt of the Group VIII metal is less than that of the Group VI heteropolyacid; and (b) subjecting the impregnated inorganic oxide support to a heat treatment wherein substantially all of the free water is driven from the impregnated inorganic oxide support at a temperature less than, or equal to, 180° C. and at a pressure less than about 400 mm of mercury; and (c) sulfiding said impregnated support, thereby forming the catalyst.

In a preferred embodiment of the present invention, the impregnated inorganic oxide support is heated from ambient temperature to about 300° C. at a heating rate from about 0.3° C./minute to 7.5° C./minute, at a pressure less than about 30 mm of mercury.

In another preferred embodiment of the present invention, the salt of the Group VIII metal is selected from acetates, formates, citrates, oxides, hydroxides, and carbonates.

In yet another preferred embodiment of the present invention, salt of the Group VIII metal is a citrate and the heteropolyacid is a phosphomolybdic or phosphotungstic acid and the support is alumina.

In still another preferred embodiment of the present invention, the impregnated organic oxide support is subjected to a heating rate from about 0.5° to 5° C. per minute at a pressure less than 1 mm of mercury and to a temperature no greater than 180° C.

BRIEF DESCRIPTION OF THE FIGURE

FIG. 3 shows the effects on catalyst activity by different methods of heating the catalysts of Examples 2, 8 and 7 hereof.

FIG. 4 shows the effects on catalyst activity of different pressures used during drying from less than 1 mm of mercury to 760 mm of mercury for Examples 1, 6a, 6b, and 6c.

DETAILED DESCRIPTION OF THE INVENTION

Figure 1:
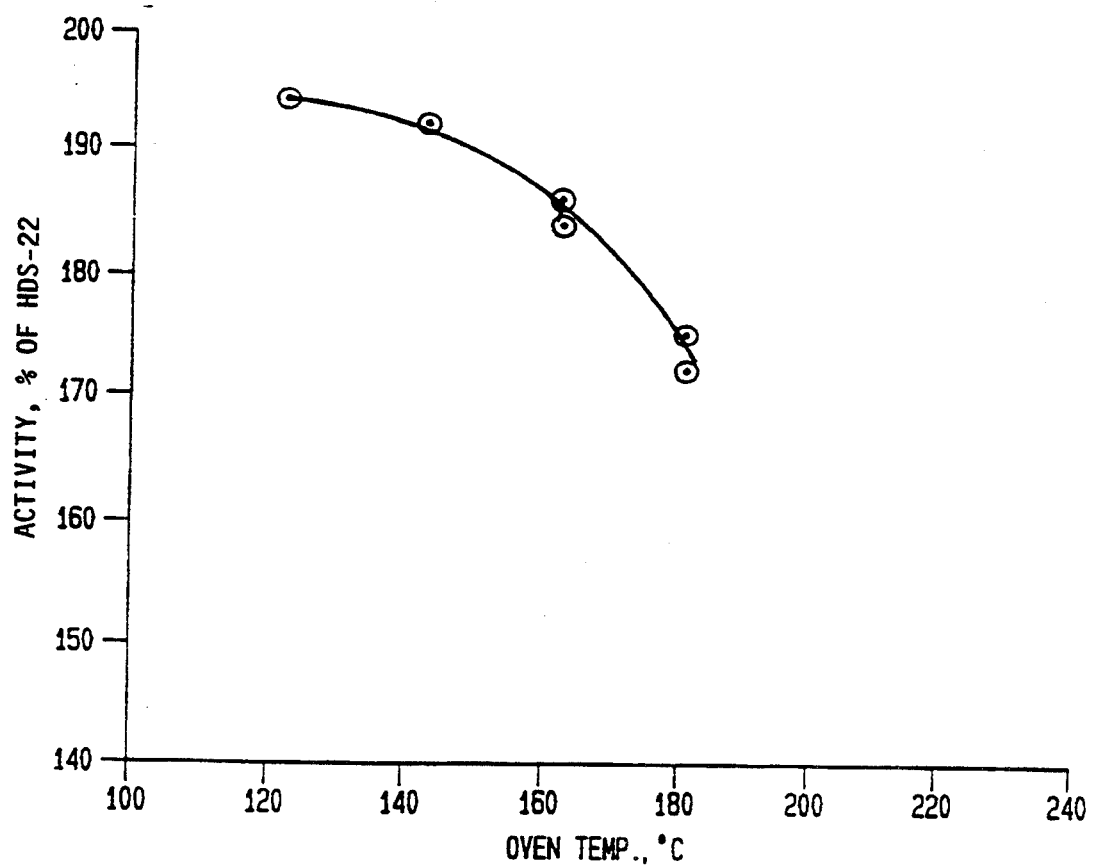
FIG. 1 shows the effect of catalyst drying temperature on activity for the catalysts of Examples 2 and 4 hereof.

A variety of feedstocks can be hydrotreated with the catalysts of the present invention, including hydrocarbonaceous fractions and whole feeds. Non-limiting examples of such feeds include organic solvents, light, middle and heavy petroleum distillates, as well as petroleum residual feeds. Other feedstocks include coal derived liquids, shale oil, and heavy oils derived from tar sands.

In the practice of the present invention, a heteroatom containing feed, especially a sulfur and/or nitrogen containing feed, is contacted with hydrogen at hydrotreating conditions in the presence of a catalyst of the present invention. The catalyst is comprised of at least one Group VIII metal, preferably Co and/or Ni, more preferably Co; and at least one Group VI metal, preferably Mo and W, more preferably Mo, on an inorganic oxide support, preferably alumina. The Group VIII metal is present in an amount ranging from about 2 to 20 wt. %, preferably from about 4 to 12 wt. %. Preferred Group VIII metals include Co, Ni, and Fe, with Co being most preferred. The preferred Group VI metal is Mo which is present in an amount ranging from about 5 to 50 wt. %, preferably from about 10 to 40 wt. %, and more preferably from about 20 to 30 wt. %. All metals weight percents are on support. By "on support" we mean that the percents are based on the weight of the support. For example, if the support were to weight 100 g., then 20 wt. % Group VIII metal would mean that 20 g. of Group VIII metal was on the support.

It is critical to the present invention that the Group VIII metal be incorporated into the support material by use of a Group VIII metal salt of an acid which has an acidity less than that of the Group VI heteropolyacid. If the acidity of the acid comprising the salt of the Group VIII metal is not less than the acidity of the heteropolyacid a catalyst complex will not form. Non-limiting examples of Group VIII metal salts of conjugate acids which are suitable for use herein includes acetates, formates, citrates, oxides, hydroxides, carbonates, and the like. Preferred are water soluble salts, more preferred are the water soluble citrates, acetates, and formates, and most preferred are the citrates.

The Group VI metal is incorporated into the support by use of a heteropolyacid. Any suitable heteropolyacid may be used in the practice of the present invention, with the water soluble acids being preferred. A detailed description of heteropolyacids can be found in *Topics in Current Chemistry* 76, "Heteropoly Compounds of Molybdenum and Tungsten", by G.A. Tsigdinas, Springer-Verlag Berlin Heidelbery, 1978, which is incorporated herein by reference. Preferred are water soluble heteropolyacids, such as phosphomolybdic acid, phosphotungstic acid, silicomolybdic acid, and silicotungstic acid. Heteropolyacids soluble in organic solvents for catalyst impregnation may also be used. Non-limiting examples of such organic solvents include alcohols, such as the $C_1$–$C_8$ aliphatic alcohols, preferably methanol.

Any suitable inorganic oxide support material may be used for the catalysts of the present invention. Preferred are alumina and silica-alumina. More preferred is alumina. Other refractory inorganic compounds may also be used, non-limiting examples of which include zirconia, titania, magnesia, and the like. The alumina can be any of the aluminas conventionally used for hydrotreating catalysts. Such aluminas are generally porous amorphous alumina having an average pore size from about 50 to 600 Å, preferably from about 70 to 300 Å, and a surface area from about 50 to about 450 $m^2/g$, preferably from about 100 to 300 $m^2/g$.

It is also within the scope of the present invention to incorporate additional Group VI and Group VIII metals onto an existing conventional hydrotreating catalyst in order to raise the metals content to levels which in the conventional catalysts yield little or no additional activity as a result of such increased metals loading. Conventional hydrotreating catalysts typically contain about 0.5 to 5 wt. % Group VIII metal and about 3 to 18 wt. % Group VI metal on an inorganic oxide support, which is typically alumina, or a co-gelled alumina-silica. By practice of the present invention, the Group VIII metal content can be increased to 20 wt. % and the Group VI metal content can be increased to 50 wt. %, with accompanying increases in activity. The procedure for incorporating these additional metals on conventional hydrotreating catalysts is the same as incorporating the metals onto a fresh support. That is, the additional Group VIII metal is incorporated into the conventional hydrotreating catalyst by way of a salt of an acid and the additional Group VI metal by way of a heteropolyacid, wherein the acid comprising the Group VIII metal salt is less acidic than the heteropolyacid.

As stated above, alumina and co-gelled alumina-silica supports are preferred. It is preferred that the support material of the present invention be surface modified with silica. It is also preferred that when the support is a go-gelled alumina-silica material that it not contain more than about 35 wt. % silica.

The silica surface modifying agent is added to the support prior to incorporation of the catalytic metals. Any suitable silicon containing compound can be used as the source of silica. For example, preferred silica sources include tetraethylorthosilicate in a suitable organic solvent, such as a $C_1$–$C_8$ alcohol, preferably isopropyl alcohol. However, such sources as silanes, colloidal silica, silicon chlorides, sodium silicate, or other organic silicon salts may also be used. Following impregnation with the silica source, the catalyst support is dried at temperatures up to about 200° C. and calcined. Calcination is effective in converting a silicon containing source to silica incorporated on the surface.

The amount of silica used to modify the surface of the support will be at least an effective amount. That is at least that amount which will enhance the activity of the catalyst for heteroatom removal, preferably at least that amount which will enhance the activity by at least about 5%, more preferably by at least about 10%. This amount of silica will generally be at least about 0.5 wt. %, preferably at least about 1 wt. %. More preferably, silica additions should range from about 1 to 25 wt. %, most preferably from about 2 to 12 wt. %.

The Group VI and Group VIII metals can be incorporated into the support using any suitable technique, preferably by an incipient wetness technique, which is well known in the art. While it is preferred that a solution containing all of the metal salts be prepared and used to impregnate the support material in one or more impregnations, it is understood that each metal can be individually impregnated into the support in any order. For example, a solution of Group VIII salt of an acid can be used to impregnate the Group VIII metal into the support. The so impregnated support can than be dried and impregnated with the Group VI heteropolyacid. For economical purposes, it is preferred that one solution be used to impregnate all of the desired metals into the support simultaneously. Any suitable impregnation conditions may be used for the preparation of the catalysts of the present invention. Generally, such conditions will include treating the support material with the impregnation solution for an effective period of time, and at an effective temperature. By effective period of time we mean for at least that amount of time in which substantially all of the metal that will be impregnated into the support will be impregnated. Generally, this amount of time will range from about 1 minute to about 48 hours, preferably from about 10 minutes to about 30 hours. An effective temperature will generally be from about 15° C. to about 100° C., preferably from about 20° C. to about 75° C.

After impregnation, the catalyst is subjected to a heat treatment. The initial part of the heat treatment is to dry the catalyst. That is, to drive any free water from the catalyst. This initial drying is performed at a temperature no greater than about 180° C. preferably no greater than 160° C. After drying is complete, the catalyst is then heated to a temperature up to about 300° C., preferably to about 250° C. at a heating rate from about 0.15° C./min to about 15° C./min, preferably at a heating rate from about 0.5° C./min to about 7.5° C./min, and more preferably from about 0.3° C./min to about 5° C./min. It will be understood that this heating does not have to be a separate step, but can merely be a continued heatup from ambient temperature wherein the catalyst first passes through the drying temperature range on its way to the predetermined maximum temperature, up to 300° C. Of course, two separte temperature steps could also be used. The heating must also be preformed at a pressure less than or equal to about 400 mm of mercury, preferably less that about 50 mm of mercury, more preferably less than about 30 mm of mercury, most preferably less than 10 mm of mercury, particularly less than 1 mm of mercury.

The precise combination of heating rate, upper temperature and pressure will be chosen so that the final catalyst is no less than 60% as active for hydrodesulfurization as the most preferred catalyst of this invention. The best catalyst of this invention is dried at a temperature of about 123° C. at less than 1 mm of mercury, without any additional heating. This most preferred catalyst is given an activity of 100% relative to other catalyst of this invention, but 194% relative to the standard commercial catalyst HDS-22. For example, a catalyst made in accordance with the present invention at a pressure of about 400 mm of mercury, dried under 180° C., and heated to 300° C. at a heating rate of less than 15° C./min will have a hydrodesulfurization activity of 60% of the most preferred catalyst of the present invention.

The controlled heating after drying enables the catalyst to be heated to higher temperatures, which can be thought of as heating and finishing the catalsyt. This controlled heating to higher temperatures has minimal effect on the decomposition of salts and complexes on the catalyst surface than a more severe heating, such as calcination.

Prior to use, the catalyst is sulfided under conventional sulfiding conditions. This sulfiding may be accomplished in situ, namely in the reactor. For example, the catalyst can be brought into contact with a sulfur-containing distillate in the presence of about 50 to 1,500 V/H/V of a hydrogen-containing gas under conditions including a temperature of about 75° C. to 450° C., a pressure (total pressure) of about 10 to 2500 psig, and a liquid hourly space velocity of about 0.3 to 2.0 V/H/V. After this sulfiding treatment, the sulfur-containing distillate is switched over to the feedstock to be treated, and the operation is restarted under operation conditions suitable for hydrotreating of the feedstock. In addition to the above process, use may be made of a process for effecting sulfiding comprising either bringing the catalyst into direct contact with hydrogen sulfide or other sulfur compounds, or by adding the sulfur compound to a suitable distillate and bringing the resulting distillate into contact with the catalyst. Suitable sulfur compounds, or sulfiding agents, which may be in the sulfur containing distillate include dimethyl disulfide, butyl mercaptan, dimethyl mercaptan, carbon disulfide, and the like.

Heteroatom removal conditions, especially hydrodesulfurization and hydrodenitrogenation conditions, will vary considerably depending on such things as the nature of the feed being treated, the nature of the nitrogen or sulfur being removed, the nature of the complexes being removed, the nature of the complexes employed, and the extent of boiling point conversion, if any, desired. Table I below sets forth typical conditions for hydrodesulfurization/hydrodenitrogenation of a naphtha boiling within a range of about 25° C. to about 210° C., a diesel fuel boiling within a range from about 170° C. to 350° C., a heavy gas oil boiling within a range of from about 325° C. to about 475° C., a lube oil feed boiling within a range of from about 290 to 500° C., or residuum containing from about 10 percent to about 50 wt. % of material boiling above about 575° C. The catalysts of the present invention are not only superior for the hydrotreating of heteroatom-containing feedstocks, but they may also be used for the saturation of aromatic compounds.

TABLE I

| Feed | Temp., °C. | Pressure psig | Space Velocity V/V/Hr. | Hydrogen Gas RatesSCF/B* |
| --- | --- | --- | --- | --- |
| Naphtha | 100–370 | 50–800 | 0.5–10 | 100–4000 |
| Diesel | 200–400 | 100–1500 | 0.4–6 | 200–6000 |
| Heavy | 260–430 | 250–2500 | 0.3–4 | 500–6000 |
| Lube Oil | 200–450 | 100–3000 | 0.2–5 | 100–10,000 |
| Residuum | 340–450 | 500–5000 | 0.1–2 | 1000–10,000 |

*SCF/B = Standard Cubic Feet Per Barrel

The following examples are presented to illustrate the invention and should not be considered limiting in any way.

EXAMPLE 1 (17794-42).

A solution was made by warming together 15.37 g of $Co(Ac)_2 \cdot 4H_2O$, 28.62 g of phosphomolybdic acid (48.5 wt. % Mo), and 13.56 g of deionized water.

This solution was impregnated onto 62.12 g of a high surface area alumina support containing 5.97 wt. % adsorbed moisture (58.41 g of dry $Al_2O_3$). The fore of the $Al_2O_3$ was 1/20" quadralobe extrudate. This alumina support had a surface area of 171 $m^2/g$ and a pore volume of 0.7364 cc/g. The impregnated mixture was allowed to sit overnight at room temperature, after which it was dried for 2 hours in a 160° C. vacuum oven at a pressure of less than 1 mm. The dried catalyst weighed 90.35 g and contained 6.23 wt. % Co and 23.76 wt. % Mo based on the dry $Al_2O_3$ content. The atomic ratio of Co/Mo was 0.427.

EXAMPLE 2 (18219-14)

A solution was made of 7.339 g of $CoCO_3$, 12.96 g of citric acid, and 28.620 g of phosphomolybdic acid with 10 ml of deionized water by warming. The solution was diluted to 38.5 ml with deionized water.

This solution was impregnated onto 64.19 g of a high surface area alumina support containing 9 wt. % adsorbed moisture (58.41 g of dry $Al_2O_3$). The fore of the $Al_2O_3$ was 1/20" quadralobe extrudate. This alumina support had a surface area of 171 $m^2/g$ and a pore volume of 0.7364 cc/g. The impregnated mixture was allowed to sit overnight at room temperature, after which it was dried for 2 hr. in a 143° C. vacuum oven at a pressure of less than 1 mm. The dried catalyst weighed 96.30 g and contained 6.23 wt. % Co and 23.76 wt. % Mo based on the dry $Al_2O_3$ content. The atomic ratio of Co/Mo was 0.427.

EXAMPLE 3

The catalysts of examples 1 and 2 were sulfided and compared for hydrodesulfurization activity in accordance with the procedure set forth below. Results vs. the HDS activity of the commercial catalysts TN-8 and HDS-22 are shown in Table II below.

Catalyst Sulfiding Conditions

The sulfiding feed used in this example comprised 7.4 wt. % of dimethyl disulfide and 92.6 wt. % of petroleum distillate. The petroleum distillate contained 0.935 wt. % sulphur, 74 wppm nitrogen, 85.44 wt. % C and 13.32 wt. % H.

With the sand bath at 93° C., hydrogen flow was started at 0 minutes and pressure adjusted to 300 psig. Hydrogen gas flow was then adjusted to maintain an exit gas rate, as measured on the Wet Test meter, of 0.30 l./min. At 2 minutes sulfiding feed was started at the rate of 20 cc./min. At 5 minutes the feed rate was reduced to 1.0 cc./min. and heating of the sand bath started. At 65 minutes the sand bath temperature was 232° C. This temperature was held while maintaining the liquid and $H_2$ flow until 725 minutes.

At this point the sand bath temperature was raised to 343° C. over approximately 45 minutes (770 minutes) and the reaction maintained under these conditions to 1055 minutes.

At this time the pressure in the reactor was raised to 500 psig, the reactor was blocked off under pressure with valves that are on both the inlet and exit lines, all flows stopped, and the reactor disconnected, removed from the sand bath and plunged into ice water.

At this point the catalyst was sulfided and ready for testing.

Testing of Catalyst

Feedstock used for testing activity of catalyst was 315+° C. bottoms from light catalytic cycle oil containing 2.148 wt. % sulfur, 1437 ppm N., 89.13% C. and 8.07% H.

The reactor containing the sulfided catalyst was immersed in the sand bath at 343° C., the lines connected to the inlet and exit systems and the valves opened. Feed was started at 1.5 cc./min. and $H_2$ at 0.45 l./min. as determined by the Wet Test meter on the exit line. Three liquid products were taken at 1 hour 20 minute intervals followed by three products at 40 minute intervals.

Product Workup

The liquid products were stripped thoroughly with $N_2$ to remove all traces of $H_2S$ and analyzed for sulfur using a Philips PW1400 x-ray fluorescence spectrometer.

Activity Evaluation

Catalyst activity was determined by comparison with the performance of TN-8, commercially available from AKZO Chemicals Inc., and HDS-22, commercially available from Criterion Catalyst Company. TN-8 is a NiCoMo on alumina hydrotreating catalyst and HDS-22 is a NiMo on alumina hydrotreating catalyst.

TABLE II
COMPARISON OF Co ACETATE AND Co CITRATE CATALYSTS OF THE PRESENT INVENTION

| Catalyst 100 | Run No. | vs. TN-8 as 100 | HDS Activity, % vs. HDS-22 as |
|---|---|---|---|
| Co Acetate Cat. of Ex. 1 | 401 | 148 | 174 |
| Co Citrate Cat. of Ex. 2 | 565 | 163 | 192 |

EXAMPLE 4

Several catalysts were made according to the procedure of Example 2 except that the drying times and temperatures were varied as follows.

(a) (Prep. 18219-15) 123° C., 2.5 hr.
(b) (Prep. 17929-159) 160° C., 2 hr.
(c) (Prep. 17929-160) 181° C., 2 hr.

These catalysts were also sulfided and tested for hydrodesulfurization activity according to the above procedure.

EXAMPLE 5

The catalytic activities of the catalysts of Examples 2 and 4 are displayed graphically in FIG. 1 to illustrate the favorable effect on hydrodesulfurization activity of using the lowest practicable drying temperature while vacuum drying.

EXAMPLE 6

Several catalysts were made according to the procedures of Examples 1 and 2 except that the drying pressures were varied.

| | Type of Prep. | Drying Press. mm of Hg | HDS Activity, % vs HDS-22 as 100 |
|---|---|---|---|
| (a) | Example 1 (17794-101) | 10 | 168 (run 485) |
| (b) | Example 1 (17929-87) | 50 | 147 (run 483) |
| (c) | Example 1 (17794-29) | 760 | 106 (run 301) |
| (d) | Example 2 (18219-26) | 25 | 182 (run 580) |
| (e) | Example 2 (18219-12) | 50 | 171 (run 569) |

These catalysts were also sulfided and tested for hydrodesulfurization activity according to the procedure set forth in Example 3 above. These hydrodesulfurization activities vs. HDS-22 are shown above.

EXAMPLE 7

Figure 2:
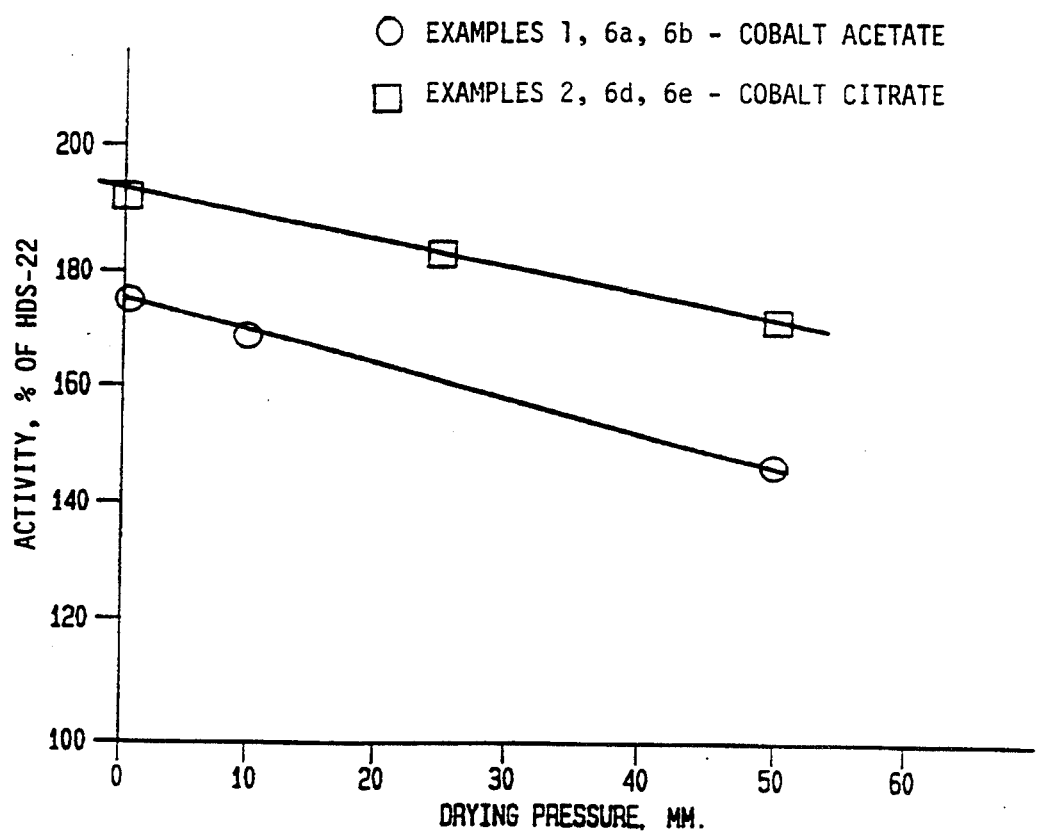
FIG. 2 shows the effect on activity of pressure during drying for the catalysts of Examples 1, 2 and 6 hereof.

The catalytic activities of the catalysts of Examples 1, 2 and 6 are displayed graphically in FIG. 2 to illustrate the favorable effect on hydrodesulfurization activity by drying at as low a pressure as practicable.

EXAMPLE 8

Catalysts were prepared according to the procedure of Example 2 except that after preparation the catalysts were calcined at several conditions as follows.

(a) Prep. 18219-46, 2 hr. 247° C. in air.
(b) Prep. 18219-32, 2 hr. 538° C. in air.
(c) Prep. 18219-50, 2 hr. 247° C. in $N_2$ These catalysts were sulfided and tested for hydrodesulfurization activity according to the procedure set forth in Example 3 above.

EXAMPLE 9 (18219-24)

A catalyst was prepared according to the procedure of Example 2 except a stagewise drying beginning at low temperature was used as follows:
2.5 hr. at 123° C.
2 hr. at 144° C.
2 hr. at 181° C.
2 hr. at 203° C.
2 hr., 10 min. at 247° C.

This catalyst was also sulfided and tested for hydrodesulfurization activity according to the procedure set forth in Example 3 above.

EXAMPLE 10

The catalytic activities of the catalysts of Examples 2, 8 and 9 are graphically displayed in FIG. 3 to illustrate the desirability of avoiding heat treating or calcining prior to sulfiding and to illustrate the greater thermal stability imparted by a staged or stepwise drying beginning at the lowest practicable temperature.

EXAMPLE 11 (17929-158)

A catalyst was prepared according to the procedure of Example 2 except using Ni(CO₃) instead of Co(CO₃).

EXAMPLE 12

The catalysts of Example 9 (Co containing) and Example 11 (Ni containing) were sulfided and compared for hydrodesulfurization and hydrodenitrogenation activities vs. KF-840 according to the procedure set forth in Example 3 above. KF-840 is a NiMo on alumina hydrodenitrogenation catalyst which is a commercially available catalyst from AKZO Chemicals Company.

These results in Table III showed the catalysts of the present invention to be much more active both for hydrodesulfurization and hydrodenitrogenation than the KF-840 catalyst.

EXAMPLE 13 (17979-114)

A catalyst was prepared according to the procedure of Example 1 except that the catalyst was dried by freeze drying. Activity for hydrodesulfurization as determined by the procedure set forth in Example 3 above was 166% of the activity of HDS 22 commercial catalyst.

TABLE III
COMPARISON OF CATALYSTS OF THE PRESENT INVENTION WITH KF-840

| Run No. | Catalyst | CATALYTIC ACTIVITY HDS | HDN |
| --- | --- | --- | --- |
| Std. | KF-840 | 100 | 100 |
| 577/591 | Catalyst of Example 9 | 271 | 121 |
| 547/590 | Catalyst of Example 11 | 125 | 130 |

What is claimed is:

1. A method for preparing a catalyst composition suitable for removing heteroatoms from a heteroatom containing feedstock, which method comprises:
   (a) impregnating an inorganic oxide support material with a Group VIII metal salt of an acid and with a Group VI heteropolyacid, wherein the acidity of the acid of the salt of the Group VIII metal is less than that of the Group VI heteropolyacid;
   (b) drying the impregnated inorganic oxide support such that substantially all of the free water is driven from the impregnated inorganic oxide support at a temperature less than, or equal to, 180° C.; and at a pressure of less than about 400 mm of mercury; and
   (c) sulfiding said impregnated support, thereby forming the catalyst.

2. The method of claim 1 wherein the heat treatment is performed at a temperature up to about 160° C. and at a pressure less than about 50 mm of mercury.

3. The method of claim 2 wherein the pressure is less than 1 mm of mercury.

4. The method of claim 1 wherein after drying the support is further heated to a temperature up to about 250° C. and at a heating rate from about 0.3° C./min to 7.5° C./min.

5. The method of claim 4 wherein the pressure is less than about 50 mm of mercury and the heating rate of the additional heating is from about 0.5° C./min to 5° C./min.

6. The method of claim 4 wherein the pressure is less than about 10 mm of mercury.

7. The method of claim 6 wherein the pressure is less than about 1 mm of mercury.

8. The method of claim 1 wherein the Group VIII metal is selected from Co and Ni and a mixture thereof, and the Group VI metal is selected from Mo and W.

9. The method of claim 4 wherein the Group VIII metal is selected from Co and Ni and a mixture thereof, and the Group VI metal is selected from Mo and W.

10. The method of claim 9 wherein the acid comprising the salt of the Group VIII metal is selected from the group consisting of acetates, formates, citrates, oxides, hydroxides, and carbonates, and the heteropolyacid is selected from phosphomolybdic acid, phosphotungstic acid, silicomolybdic acid, and silicotungstic acid.

11. The method of claim 10 wherein the salt of the Group VIII metal is a citrate, and the heteropolyacid is selected from phosphomolybdic acid, phosphotungstic acid, silicomolybdic acid, and silicotungstic acid.

12. The method of claim 11 wherein the inorganic oxide support is selected from alumina, silica, and cogelled alumina-silica.

13. The method of claim 12 wherein about 4 to 12 wt. % Group VIII metal and from about 10 to 40 wt. % Group VI metal are used.

14. The method of claim 13 wherein prior to impregnation the inorganic oxide support is modified with silica.

15. The method of claim 14 wherein the silica source is tetra-ethylorthosilicate.

16. The method of claim 7 wherein the Group VIII metal is selected from Co and Ni and a mixture thereof, and the Group VI metal is selected from Mo and W.

17. The method of claim 16 wherein the acid comprising the salt of the Group VIII metal is selected from the group consisting of acetates, formates, citrates, oxides, hydroxides, and carbonates, and the heteropolyacid is selected from phosphomolybdic acid, phosphotungstic acid, silicomolybdic acid, and silicotungstic acid.

* * * * *